INVENTORS.
JOHN H. CRANKSHAW
ROBERT A. LASLEY
BY Owen & Owen
ATTORNEYS

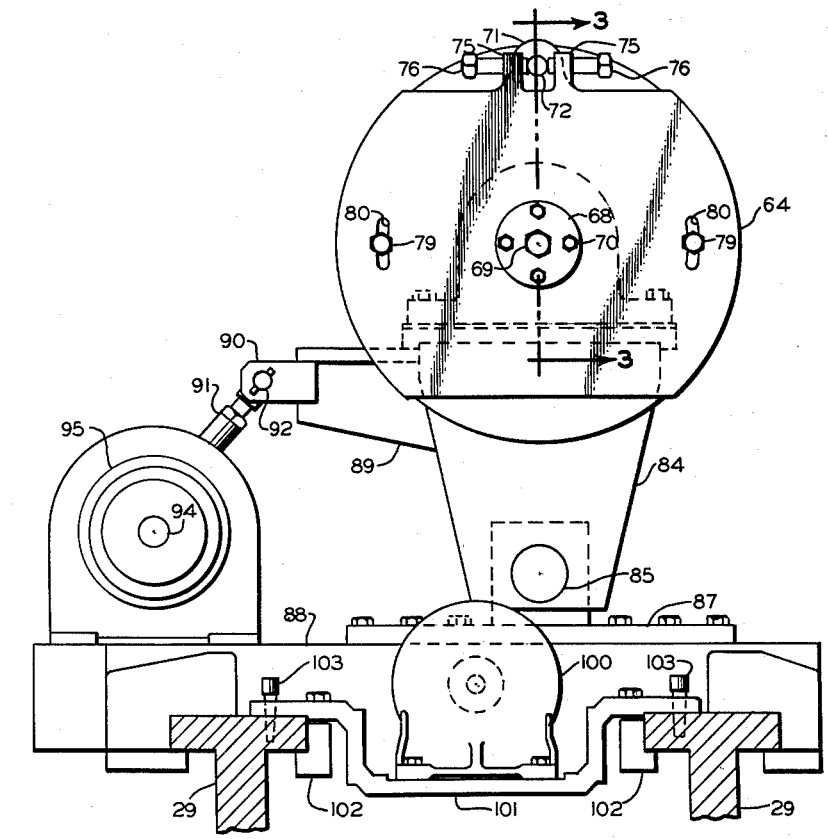
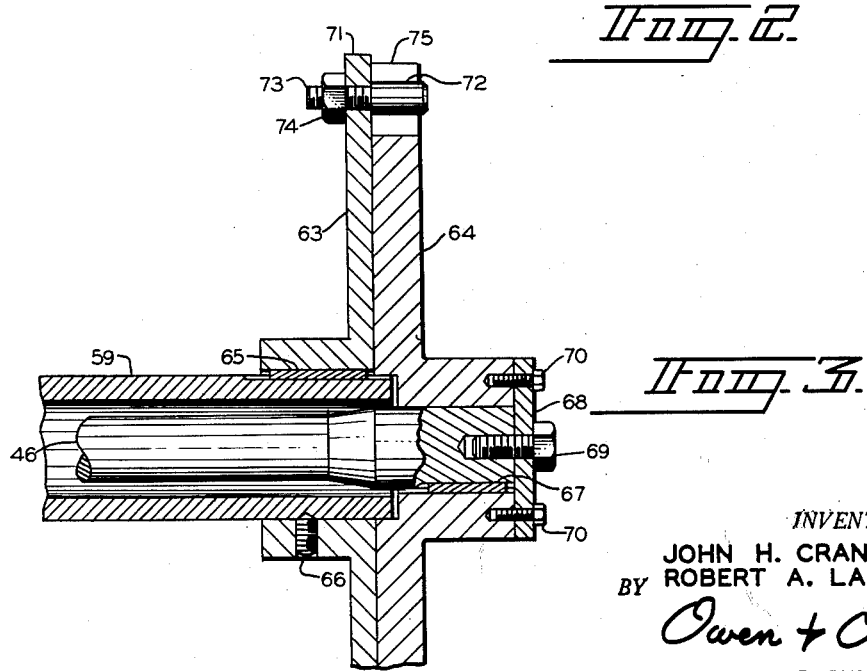

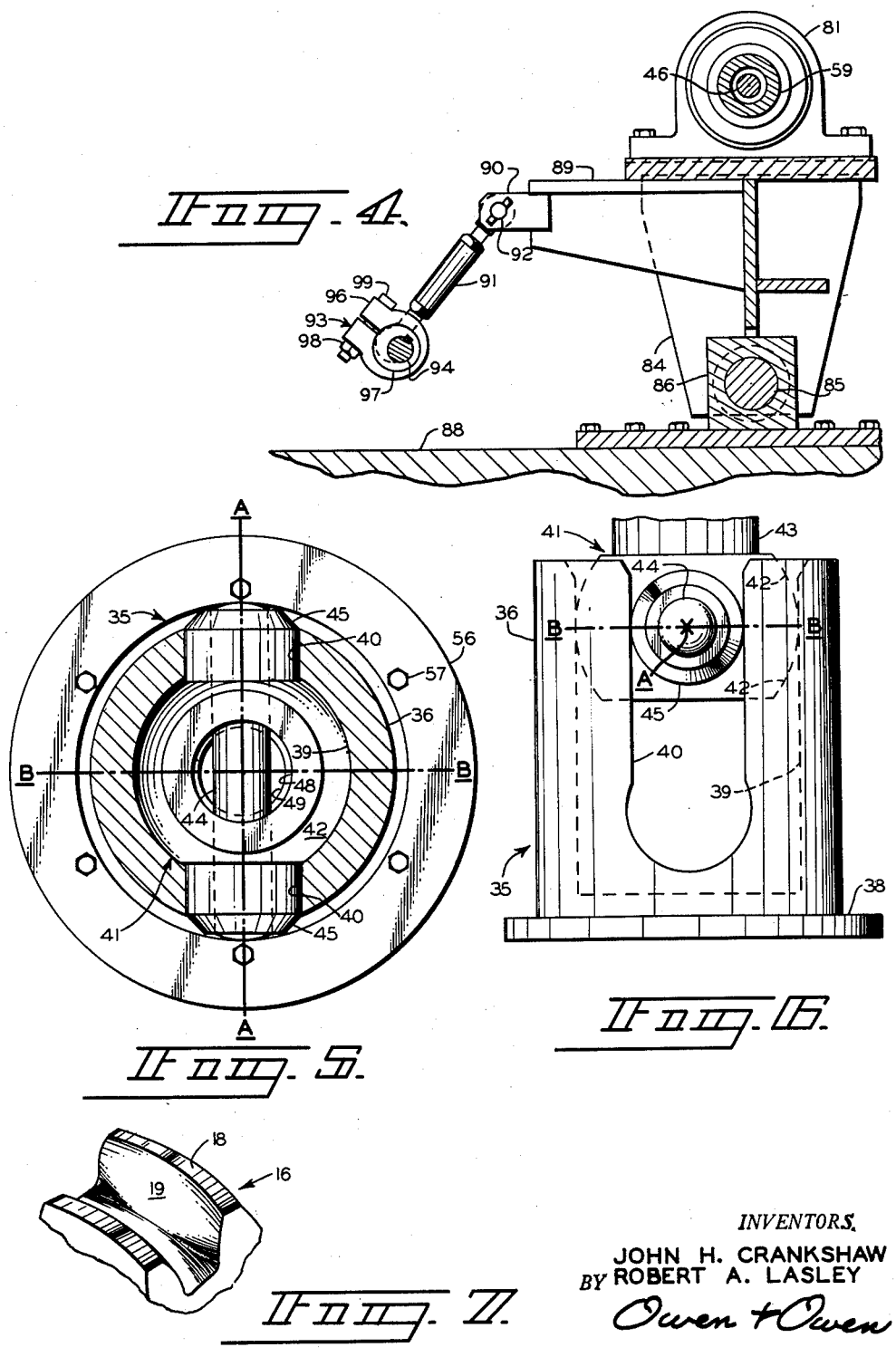

3,102,369
APPARATUS FOR FINISHING TOOTH SURFACES OF MISALIGNMENT COUPLINGS
John H. Crankshaw, Erie, Pa., and Robert A. Lasley, Hamilton, Ohio, assignors to Baldwin-Lima-Hamilton Corporation, Philadelphia, Pa., a corporation of Pennsylvania
Filed Jan. 5, 1961, Ser. No. 80,898
7 Claims. (Cl. 51—26)

The present invention is related to an apparatus for finishing the contacting surfaces of teeth that are in meshing engagement, and more particularly for lapping the tooth surfaces of gear-type misalignment couplings where one of the contacting surfaces is crowned.

Gear-type misalignment couplings having crowned teeth are used in normal service to transmit mechanical power from one rotating shaft to another where such shafts are not in exact alignment. This type of coupling comprises a cylindrical hub mounted on one of the shafts, the hub having external teeth formed on its peripheral surface which are in meshing engagement with mating internal teeth on the interior surface of a sleeve that is connected to the other of the misaligned shafts.

The sleeve and its shaft are rotatable about an axis extending along the centerline of the shaft through the sleeve while the hub and its shaft are rotatable about another axis that likewise extends along the centerline of the shaft and hub but is misaligned with the axis of the sleeve, either angularly or in parallel offset relationship. The external teeth on the hub may not only slide axially with respect to the sleeve teeth but may also roll on the internal sleeve teeth in a manner determined by the curvature of the crowned teeth and the angle of misalignment to which the mesh is subjected.

Such couplings may be quite large when they are used on ships for transmitting power from the drive shaft to the propeller shaft. These couplings must be able to transmit high torques between the shafts and must also be quiet in operation. As the tooth loading increases with higher torques, the necessity for very hard surfaces on the teeth also increases. These surfaces are hardened by conventional processes which cause dimensional distortion in the teeth. This is undesirable because distortion causes the teeth to wear excessively and the coupling to operate noisily. Likewise the load distribution on the coupling teeth becomes uneven when the required tooth geometry is destroyed by hardening.

The dimensional accuracy of the teeth may be restored by a finishing operation such as lapping, and it is important that such an operation approximate the same geometric motion as will be encountered by the coupling during service. If this geometric motion is not duplicated, the geometry of the teeth may be made worse and the coupling will not function properly when placed in service.

It is, therefore, the object of the present invention to provide a new apparatus for restoring the dimensional accuracy of hardened teeth in misalignment couplings in order to insure maximum distribution of the load on the active coupling teeth.

Another object of the invention is to provide apparatus for finishing the contacting surfaces of teeth in a misalignment coupling which essentially duplicates the geometric motion that occurs during normal service of the coupling under conditions of maximum misalignment.

Still another object of the invention is to provide apparatus for finishing the contacting surfaces of teeth in a misalignment coupling which includes a portion for applying high torques between these surfaces without imposing such torques on portions of the apparatus which rotate and oscillate the coupling.

Other objects and advantages of the invention will be apparent from the following description and from the drawings in which like numbers are utilized throughout to identify like parts.

FIG. 2 is an end view of the apparatus shown in FIG. 1 taken from the right-hand side thereof;

FIG. 3 is a sectional view taken along the line 3—3 of FIG. 2;

FIG. 4 is a sectional view taken along the line 4—4 of FIG. 1;

FIG. 5 is a sectional view taken along the line 5—5 of FIG. 1;

FIG. 6 is a plan view of the apparatus shown in FIG. 5 from the position indicated by the line 6—6 in FIG. 1; and FIG. 7 is a perspective view of typical teeth formed on the hub of the misalignment coupling.

Figure 1:
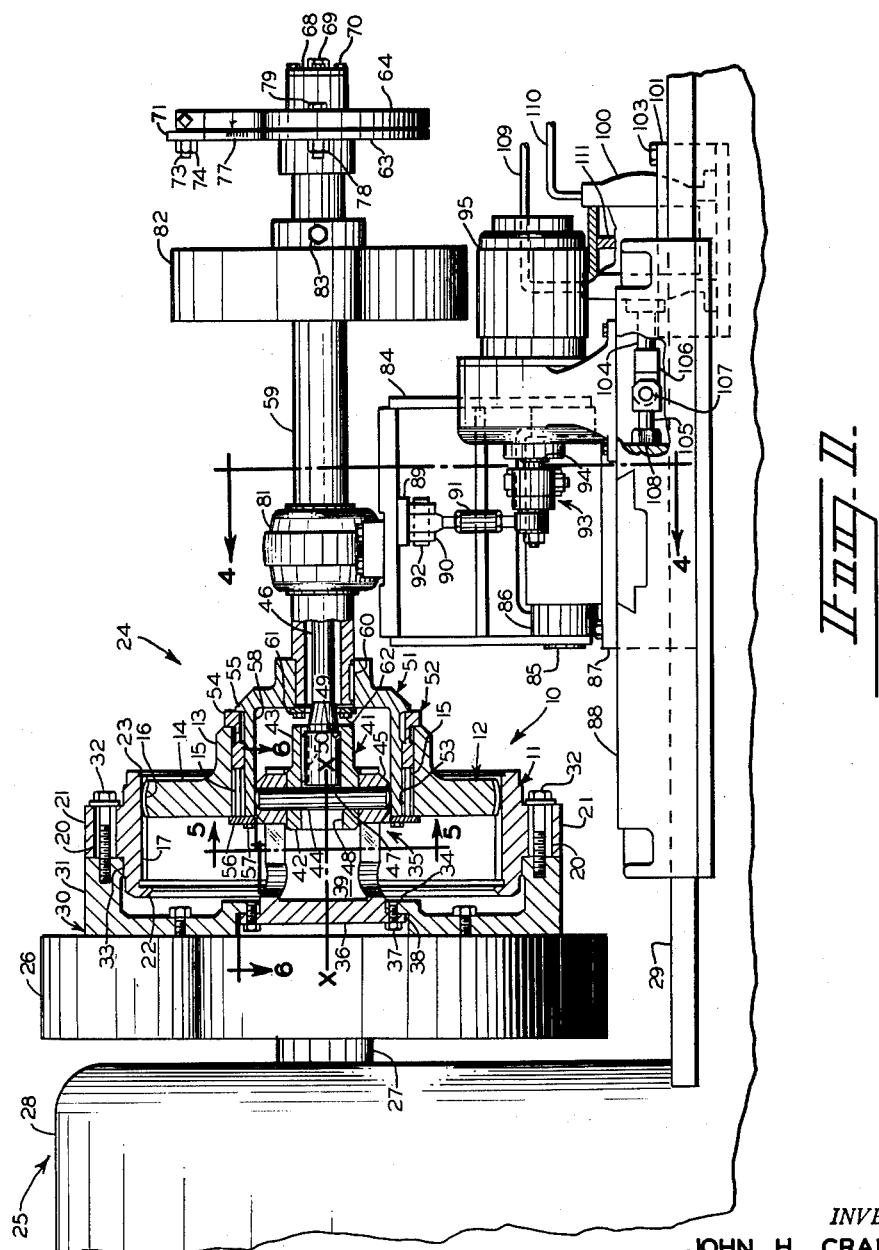
FIG. 1 is a view in elevation, with a portion in axial section, of the apparatus used in carrying out the invention.

In order to achieve the objects of the invention, the hardened sleeve of the coupling is rigidly mounted on a suitable driving mechanism, such as a lathe, while the hardened hub is maintained within the sleeve by a fixture which is connected to the lathe face plate through a swivel coupling which permits movement of the hub relative to the sleeve. More particularly, a hollow shaft rigidly secured to the fixture contains a torque shaft which is connected to the swivel coupling and a circumferential loading is applied between the internal and external teeth through their contacting surfaces by twisting torque plates on the ends of these shafts a predetermined amount.

While the circumferential loading is applied, the teeth are finished to their design configuration thereby restoring their dimensional accuracy both by duplicating the reciprocating and pivotal motions of the hub within the sleeve which occurs during normal service of the coupling under conditions of maximum misalignment and by applying a lapping compound to the teeth as they slide and turn relative to each other. This motion is obtained by rotating the face plate to turn the coupling and by oscillating both shafts about the swivel coupling to establish a continuously varying misalignment angle having a maximum value equal to the greatest amount of angular misalignment that is expected to be encountered in service. The shafts are also reciprocated along the ways of the lathe during the rotation of the coupling and the oscillation of the shafts, to slide the hub within the sleeve.

It is extremely important that the three motions involved in finishing the teeth, i.e. axial sliding, rotation and continuous angular misalignment, be random and not repetitive in a standard geometric pattern. Also the magnitude of the known static torque applied by twisting the plates is dependent upon the material used in the coupling and the characteristics of the lapping compound. This static torque is not imposed on either the apparatus used to rotate the face plate or the apparatus used to oscillate and reciprocate the shafts.

Referring now to the drawings and more particularly to FIG. 1, there is shown a gear-type misalignment coupling generally indicated at 10 which comprises a tubular sleeve 11 and a mating hub 12. The hub 12 is generally cylindrical with an elongated center portion 13 in an outwardly extending flange 14. The center portion 13 contains a bore which is adapted to receive a shaft (not shown) when mounted for service, and the bore is generally splined at 15 to rigidly mount the hub 12 on this shaft.

External teeth 16 are formed on the peripheral surface of the hub flange 14, and the hub 12 is mounted within a bore extending through the sleeve 11 with the teeth 16 in meshing engagement with mating internal teeth 17 formed within the sleeve bore. The teeth 17 are straight and substantially longer than the teeth 16 as shown in FIG. 1 to permit axial displacement of the hub 12 relative to the sleeve 11 during normal service.

As shown in FIG. 7, each of the teeth 16 has a tip 18 which is preferably crowned; that is, the top of each tooth on the addendum circle is curved to enable the hub 12 to rotate with respect to the centerline of the sleeve 11 in normal service. Each of the teeth 16 also has oppositely disposed flanks 19 which are likewise crowned; that is, each flank or side face of the tooth between the root circle and the addendum circle is curved to enable the teeth 16 to roll along mating flank surfaces of the teeth 17 during normal service.

When in service, the sleeve 11 may be secured to a collar (not shown) on a shaft by bolts which pass through holes 20 extending through a peripheral flange 21 that protrudes outwardly around the periphery of the sleeve 11, and an inwardly directed lip 22 on the collar end of the sleeve 11 limits axial movement of the hub 12 by engaging the end surfaces of the teeth 16. The oppositely disposed end of the sleeve 11 is provided with a suitable relief 23 for receiving a retaining ring (not shown) after the hub 12 has been permanently assembled within the bore of the tubular sleeve 11.

According to the present invention, a lapping device generally indicated at 24 is provided for finishing the surfaces of the contacting surface of the flanks of the teeth 16 and 17. The lapping device 24 may be conveniently mounted upon a lathe 25 which has a face plate 26 mounted for rotation about a normal axis X—X extending along a spindle 27 that is contained in a head stock 28. A set of ways 29 shown in FIGS. 1 and 2 extends parallel to the axis X—X from the head stock 28.

A generally circular plate 30 is provided for rigidly mounting the sleeve 11 on the face plate 26 for rotation about the axis X—X. The plate 30 includes a forwardly extending flange 31 which engages the sleeve flange 21, and the sleeve 11 is rigidly secured to the plate 30 by bolts 32 that extend through the holes 20. The sleeve 11 is accurately positioned by an inwardly directed lip 33 on the flange 31 having an accurately machined inner surface that engages a mating surface on the sleeve 11.

The plate 30 is bolted to the face plate 26, and the center portion of the plate 30 is offset in the same direction as the flange 31 to form a recessed portion at 34 having a bore passing therethrough. The hub 12 is mounted within the sleeve 11 and is connected to the recessed portion 34 in a manner whereby the hub 12 may be moved in much the same geometric motion as will be encountered by the coupling 10 during normal service.

As shown in FIGS. 1, 5 and 6, the mounting means for the hub 12 comprises a swivel coupling 35 which includes a generally cylindrical member 36 that is receivable within the bore of the plate 30 at the recessed portion 34 for accurate positioning relative to the sleeve 12. The member 36 is rigidly secured to the plate 30 by bolts 37 that pass through a shoulder 38 on the end of the member 36 into the recessed portion 34 of the plate 30. Consequently the cylindrical member 36 is rigidly mounted on the face plate 26 for rotation about the same axis as the sleeve 11; i.e. the axis X—X. The member 36 has a generally cylindrical bore 39 extending along the axis X—X, and a pair of oppositely disposed, aligned slots 40 are formed in the walls of the member 36.

The mounting means further comprises a movable member 41 that is mounted in the member 36 for both pivotal and axial movement relative thereto. As shown in FIG. 6, the member 41 has a curved portion 42 with a cylindrical neck 43 extending outwardly therefrom away from the face plate 26. The curved portion 42 contacts the walls of the bore 39 for rolling and sliding engagement along the axis X—X. A pin 44 extends through the portion 42 and the slots 40 while antifriction rollers 45 are mounted on the pin 44 on opposite sides of the portion 42.

An elongated torque shaft 46 extends outwardly from the movable member 41 above the ways 29. As shown in FIG. 1, the torque shaft 47 has an enlarged portion 47 that is received in a bore 48 which extends through the movable member 41. Axial movement of the shaft 46 away from the face plate 26 is limited by a shoulder 49 at the end of the neck 43, and similar movement in the opposite direction is limited by the pin 44. The torque shaft 46 is rigidly secured to the movable member 41 by a key 50 that is retained in suitable keyways formed in both the neck 43 and the enlarged portion 47 of the shaft 46. The end of the torque shaft 46 is connected to the sleeve 11 through the plate 30 and the swivel coupling 35.

The hub 12 is mounted on a fixture 51 which is inserted in the bore thereof that contains the spline 15. A mounting ring 52 having external teeth for engaging the spline 15 and internal teeth for engaging a similar spline 53 on the outer surface of the fixture 51 is interposed between the hub 12 and the fixture 51. The mounting ring 52 has a shoulder 54 which engages both the end surface of the hub center portion 13 and a lip 55 which extends outwardly from the fixture 51. Any axial motion imparted to the fixture 51 is transferred through the shoulder 54 to the hub 12 while rotational motion is likewise transferred through the ring 52 between the splines 15 and 53.

A circular retainer 56 is secured to the fixture 51 at the opposite end thereof from the lip 55 by bolts 57 as shown in FIGS. 1 and 5. The retainer 56 maintains the shoulder 54 in engagement with both the hub 12 and the fixture 51, thereby preventing axial motion of the fixture 51 relative to the hub 12. The fixture 51 has a bore extending therethrough, and a portion of the bore indicated at 58 has an enlarged diameter which forms a recess for containing the movable member 41 as well as the pin 44 and a portion of the cylindrical member 36. The surface of the enlarged bore portion 58 engages the ends of the pin 44 to prevent movement thereof normal to the axis of the fixture 51.

A tubular shaft 59 extends outwardly from the fixture 51 and has a hollow interior for receiving the torque shaft 46. As shown in FIG. 1, the tubular shaft 59 has a reduced diameter at the end toward the face plate 26 which is received in the bore of the fixture 51 and is rigidly secured thereto by a key 60 that is retained in suitable keyways formed in both the shaft 59 and the fixture 51. Axial movement of the shaft 59 toward the face plate 26 is prevented by a shoulder at the end of the reduced diameter which engages the end of the fixture 51, and similar movement in the opposite direction is prevented by a circular retainer 61 that is mounted on the innermost end of the shaft 59 by bolts 62. The retainer 61 engages both the end of the shaft 59 and interior surface of the fixture 51.

Torque plates 63 and 64 are provided for applying opposing static torques of known magnitude to the ends of the shafts 46 and 59 remote from the fixture 51 and the swivel coupling 35 therein. As shown in FIG. 3, the torque plate 63 is mounted on the end of the shaft 59, and a key 65 which is received in suitable keyways formed in both the elongated central portion of the plate 63 and the end of the shaft 59 transmits any twisting force from the plate 63 to the shaft 59. While the key 65 prevents rotational movement of the plate 63 relative to the shaft 59, axial movement of this plate along its shaft is prevented by a setscrew 66 which is threadably carried in the central portion of the plate 63 for engaging in a suitable depression provided on the shaft 59.

The torque plate 64 is similarly mounted upon the torque shaft 46 by a key 67 that is received in suitable keyways provided in both the central portion of the plate 64 and the enlarged end of the torque shaft 46. An end cap 68 is rigidly secured to the enlarged end of the torque shaft 46 by a bolt 69 passing through the center thereof. Bolts 70 secure the end cap 68 to the central portion of the plate 64 to prevent axial movement of the plate 64 relative to the torque shaft 46. As shown in FIG. 3, plate 64 while fixed to the inner torque shaft 46 is freely rotatable relative to the outer shaft 59.

As shown in FIG. 2, the torque plates 63 and 64 are generally circular with oppositely disposed chordal portions removed to form parallel flat surfaces. As shown in FIGS. 1 to 3, an ear 71 protrudes from the flat surface on the plate 63 at the center thereof, and a pin 72 extends therefrom in the direction of the plate 64. The pin 72 has a threaded portion 73 of reduced diameter which is received in the ear 71 and is rigidly secured thereto by a nut 74.

A pair of tabs 75 extend outwardly from the corresponding flat surface on the plate 64 on opposite sides of the pin 72 as shown in FIG. 2. Adjusting screws 76 are threadably received in the tabs 75 and extend therethrough into engagement with the pin 72. By turning the respective screws 76 in the proper direction against the pin 72, the torque plate 64 is twisted relative to the torque plate 63 thereby applying opposing torques to the ends of the shafts 46 and 59 through the keys 67 and 65 respectively.

To indicate the amount of angular rotation of the plate 63 relative to the plate 64, suitable scale 77 is imprinted upon the peripheral surface of the plate 63 while an indicating arrow or the like is imprinted upon the peripheral surface of the plate 64. By properly turning the adjusting screws 76 until the arrow moves to a predetermined point opposite the scale 77, a known static torque is applied to the shafts 46 and 59 which, in turn, supplies a circumferential loading of desired magnitude between the teeth 16 and 17 without applying torques to either the lathe spindle 27 or the mechanisms for oscillating and reciprocating the shafts 46 and 59 that will be described later in detail.

After the plates 63 and 64 have been twisted the predetermined amount, they are locked in position by any suitable means such as by tightening nuts 78 on bolts 79 that are mounted on the plate 63 and pass through slots 80 in the plate 64 as shown in FIG. 2. The opposite surfaces of the teeth 16 and 17 are likewise circumferentially loaded by twisting the plates 63 and 64 in the opposite direction when the screws 76 are turned in the opposite direction.

The tubular shaft 59 with the torque shaft 46 contained therein is mounted within a single spherical bearing 81 as shown in FIGS. 1 and 4. The weight of the hub 14 is selectively counterbalanced by a weight 82 that is movable axially over the tubular shaft 59 on the opposite side of the spherical bearing 81 from the hub 14. The weight 82 is secured to the shaft 59 when properly positioned by tightening a bolt 83 thereagainst as shown in FIG. 1.

The spherical bearing 81 is bolted to the top of a frame 84 as shown in FIGS. 1 and 2. The bottom of the frame 84 is mounted for oscillating movement on a journal 85 that is substantially parallel to the axis X—X. The journal 85 is carried by a bearing 86 that is secured to a plate 87. A carriage 88 which rests upon the ways 29 and is movable therealong supports the plate 87 which is bolted thereto. The frame 84 is so constituted and the journal 85 is so positioned that the bearing 81 is coaxial with the lathe spindle 27 when the bearing 81 is located directly above the journal 85 as shown in FIG. 4. Inasmuch as the shaft 59 is rigidly secured to the bearing 81, any movement by the carriage 88 along the ways 29 will move the hub 12 within the sleeve 11.

Oscillating motion is imparted to the shaft 59 through the bearing 81 by rocking the frame 84 on the journal 85 to swing the torque shaft 46 through a predetermined arc to produce a continuous angular misalignment of variable magnitude between the hub 12 and the sleeve 11. As the coupling 10 turns with the face plate 26, a random pivotal motion is imparted to the hub 12.

More particularly, an arm 89 extends forwardly from the frame 84 towards the front of the lathe 25 as shown in FIGS. 1, 2 and 4, and a clevis 90 is secured to the front of the arm 89. A turnbuckle 91 is pivotally mounted on the clevis 90 by a pin 92 which extends therethrough.

Referring now to FIGS. 1 and 4, an eccentric device 93 connects the end of the turnbuckle 91 opposite the pin 92 to a drive shaft 94 of a motor 95 mounted on the carriage 88. The arc through which the frame 84 oscillates is selectively altered by rotating a clamp 96 on the eccentric 93 about a cam 97 that is keyed to the drive shaft 94 to change the throw of the crank portion of the eccentric device 93. When the proper throw has been determined, the clamp 96 is tightened on the cam 97 by tightening a nut 98 on a bolt 99 that extends through the clamp 96, and the turnbuckle 91 is correspondingly adjusted to position the bearing 81 coaxial with the spindle 27 at the center of oscillation of the frame 84.

The hub 12 slides axially within the sleeve 11 when the carriage 88 is moved back and forth along the ways 29 to impart a reciprocating motion to the shaft 59 through the bearing 81. The carriage 88 is moved by a double acting air cylinder 100 shown in FIGS. 1 and 2 which is mounted on a support 101 that is rigidly secured to the lathe 25 by clamps 102 and bolts 103 that engage the ways 29. A piston rod 104 protrudes from the cylinder 100 and is connected to the central portion of the carriage 88 by an eye-bolt 105 and clevis 106.

A pin 107 etxends through both the eye-bolt 105 and the clevis 106 while a nut 108 locks the eye-bolt 105 in position on the carriage 88. The relative position between the carriage 88 and the piston rod 104 may be selectively altered by removing the pin 107 and loosening the nut 108 whereby the eye-bolt 105 can be screwed into or out of the carriage 88. Air is supplied to and exhausted from air cylinder 100 through fluid lines 109 and 110 that are connected to a suitable control device (not shown) which is operative to reverse the direction of the movement of a piston 111 connected to the piston rod 104.

In order to carry out the method of the present invention, the cylindrical member 36 with the movable member 41 disassembled therefrom is inserted through the bore in the recessed portion 35 of the plate 30 and is secured thereto by the bolts 37. The plate 30 is then bolted to the face plate 26, and the sleeve 11 of the misalignment coupling is bolted to the flange 31. A lapping compound consisting of a mixture of oil and abrasive material is then applied to the teeth 17.

The bolts 103 are removed from the support 101 and the clamps 102 are loosened to enable the support 101 and the carriage 88 to be moved along the ways 29 a distance sufficient to permit the fixture 51 to clear the sleeve 11. The hub 12 is mounted upon the fixture 51 and the assembly is balanced on the bearing 81 by sliding the weight 82 axially along the shaft 59. Thereupon the bolt 83 is tightened against the shaft 59.

With the pin 44 and the rollers 45 in alignment with the slots 40 in the cylindrical member 36, the carriage 88 and the support 101 are moved toward the face plate 26 a distance sufficient to position the hub 12 of the coupling within the coupling sleeve 11 with the teeth 16 and 17 in meshing relationship.

The stroke of the piston 104 is adjusted to equal the maximum axial misalignment which is to occur in the coupling 10 during service.

The eccentric 93 is then adjusted so that the shaft 59 is oscillated through an arc equal to the arc of maximum angular misalignment which will be encountered during normal service of the coupling 10. The torque plates 63 and 64 are twisted relative to each other by turning the screws 76 against the pin 72, and when the desired angular displacement is indicated on the scale 77, the nuts 78 are tightened on the bolt 79.

The lathe 25 is started which turns the spindle 27 and the face plate 26 to rotate the coupling 10, the swivel coupling 35, the shafts 46 and 59, and the plates 63 and 64. The motor 95 is started which oscillates the shaft 59 in a manner previously described. Inasmuch as both the shafts 46 and 59 are rigidly connected by the torque plates 63 and 64, the oscillation of the shaft 59 while the coupling 10 is turned moves the hub 12 relative to the sleeve 11 with a random pivotal motion about the pin 44. So long as the rate of oscillation caused by the motor 95 is not an integral multiple of the rate of rotation of the sleeve, the coupling hub will execute the proper random movement, and this random effect is further assured by the periodic longitudinal movement imparted by the air cylinder 100.

Referring to FIGS. 5 and 6, the movable member 41 swings about an axis A—A along the centerline of the pin 44 as it turns in the rollers 45. The member 41 also swings about an axis B—B which is normal to the axis A—A as the pin 44 and the rollers 45 slide in the slots 40. The portion 42 is adequately curved to prevent binding of the movable member 41 in the bore 39 when the hub 12 is moved through the maximum angle of misalignment that can be accommodated by the hub teeth 16. The carriage 88 is reciprocated along the ways 29 by the air cylinder 100 to duplicate the maximum reciprocating motion of the hub 12 relative to the sleeve 11 which is to be encountered during normal service of the coupling 10. During this reciprocating motion the pin 44 and rollers 45 slide in the slots 40.

As the teeth 16 slide along the teeth 17, the operator brushes additional lapping compound thereon to finish the contacting surfaces thereof. After a period of time sufficient to restore the desired geometry to one side of each of the teeth 16, the torque plates 63 and 64 are twisted in the opposite direction as previously described and the lathe 25, motor 95 and cylinder 100 are again actuated to lap the opposite side of each of the teeth 16.

After the teeth 16 and 17 are finished, the bolts 32 are removed from the flange 51 and a retaining ring is positioned in the relief 23 to prevent the hub 12 from being removed from the sleeve 11. The retainer 56 is removed from the fixture 41 thereby enabling the coupling 10 to be disassembled from the lapping device 24 as a unit.

While the lapping device of the invention has been illustrated as being mounted upon a lathe, other suitable driving mechanisms may be utilized. Likewise various modifications to the structural parts of the lapping device may be made without departing from the spirit of the invention.

We claim:

1. Apparatus for finishing contacting surfaces of internal and external teeth in a misalignment coupling of the type comprising a tubular sleeve having internal teeth formed thereon and a mating hub having external teeth formed thereon; said apparatus comprising mounting means for maintaining the hub within the sleeve with the internal and external teeth in meshing relationship, said mounting means comprising a first shaft extending along the normal axis of the sleeve, first coupling means for connecting one end of said first shaft to the sleeve, a second shaft having a hollow interior for receiving said first shaft, second coupling means for connecting one end of said second shaft to the hub, means for applying opposing torques to the other ends of said first and second shafts to transmit a circumferential loading between the internal teeth and the external teeth, and means for simultaneously moving said first shaft and said second shaft relative to the normal axis of the sleeve.

2. Apparatus for finishing contacting surfaces of internal and external teeth in a misalignment coupling as claimed in claim 1, including swivel means for movably connecting said one end of said first shaft to the sleeve, and recessed member for rigidly connecting said one end of said second shaft to the hub, said swivel means being mounted within the recess of said member.

3. Apparatus for finishing contacting surfaces of internal and external teeth in a misalignment coupling as claimed in claim 2, including means for oscillating said first shaft and said second shaft through an arcuate path about said swivel means.

4. Apparatus for finishing contacting surfaces of internal and external teeth in a misalignment coupling as claimed in claim 1, including a first plate rigidly secured to said other end of said first shaft, a second plate rigidly secured to said other end of said second shaft, and means for selectively rotating said first plate relative to said second plate.

5. Apparatus for finishing contacting surfaces of internal and external teeth in a misalignment coupling of the type comprising a sleeve having internal teeth formed thereon and a mating hub having external teeth formed thereon, the coupling being operable in normal service for transmitting power between misaligned shafts with the sleeve being mountable on one of the shafts that is rotatable about a first axis extending along the centerline of the shaft and through the sleeve, and the hub being mountable on another of the shafts that is rotatable about a second axis angularly misaligned with the first axis; said apparatus comprising mounting means for maintaining the hub within the sleeve with the internal and external teeth in meshing relationship, said mounting means comprising a first shaft extending along the normal axis of the sleeve, first coupling means for connecting one end of said first shaft to the sleeve, a second shaft having a hollow interior for receiving said first shaft, second coupling means for connecting one end of said second shaft to the hub, means for applying opposing torques to the other ends of said first and second shafts to transmit a circumferential loading between the internal and external teeth, a member having one end mounted for pivotal movement about an axis substantially parallel to the normal axis of the sleeve, means for securing the oppositely disposed end of said member to said second shaft, means for oscillating said member about said last named axis, and means for rotating the hub and sleeve while said member is oscillated thereby substantially duplicating the action between the internal teeth and the external teeth during normal service of the coupling.

6. In combination with a machine tool having a face plate mounted thereon for rotation about a normal axis and ways extending parallel to said axis in a direction normal to the face plate, apparatus for finishing contacting surfaces of teeth in a misalignment coupling of the type comprising a tubular sleeve having internal teeth formed thereon and a hub having external teeth formed thereon, the hub being located within the sleeve with the contacting surfaces of the teeth in meshing engagement; said apparatus comprising means for rigidly mounting the sleeve on the face plate for rotation about the normal axis thereof, means for swivelly mounting the hub on the face plate with said surfaces in meshing engagement, and means mounted on the ways for moving the hub within the sleeve with a reciprocating pivotal motion.

7. In combination with a lathe having a face plate mounted thereon for rotation about a normal axis and ways extending parallel to said axis in a direction normal to the face plate, apparatus for finishing contacting surfaces of teeth in a misalignment coupling of the type comprising a tubular sleeve having internal teeth formed thereon and a hub having external teeth formed thereon, the hub being located within the sleeve with the contacting surfaces of the teeth in meshing engagement; said apparatus comprising means for rigidly mounting the sleeve on the face plate for rotation about the normal axis thereof, coupling means comprising a first member and a second member extending outwardly therefrom, swivel means for mounting said second member for pivotal and axial movement on said first member; means for rigidly securing said first member to the face plate, a first shaft having one end secured to said second member and extending along the normal axis of the face plate above the ways, a second shaft having a hollow interior for receiving said first shaft, a recessed member for containing said second member and connecting said second shaft to the hub, means mounted on the ends of said first and second shaft remote from said swivel means and said recessed member for applying opposing torques to said shafts to transmit a circumferential loading between the internal and external teeth, a carriage mounted for reciprocating movement on the ways along a path substantially parallel to the normal axis of the face plate, an elongated member mounted on said carriage for arcuate movement, means for securing said elongated member to said second shaft between said recessed member and said torque applying means, means on said carriage for rocking said elongated member through a predetermined arc thereby oscillating said first and second shafts and said hub on said swivel means relative to said normal axis, and means mounted on the ways for reciprocating said carriage along said path whereby said elongated member is moved along the ways, said first and second shafts, said hub, said recessed member, and said second member are all moved along said normal axis.

References Cited in the file of this patent

UNITED STATES PATENTS

| | | |
|---|---|---|
| 1,559,908 | Parsons et al. | Nov. 3, 1925 |
| 1,916,117 | Robinson | June 27, 1933 |
| 1,924,736 | Fehr | Aug. 29, 1933 |
| 1,966,172 | Jackowski | July 10, 1934 |
| 1,989,650 | Drummond | Jan. 29, 1935 |
| 2,036,246 | Wills | Apr. 7, 1936 |

FOREIGN PATENTS

| | | |
|---|---|---|
| 365,352 | Great Britain | Jan. 21, 1932 |